(12) United States Patent
Yonezawa

(10) Patent No.: US 7,909,470 B2
(45) Date of Patent: Mar. 22, 2011

(54) IMAGE PROJECTION METHOD AND PROJECTOR

(75) Inventor: Ryouichi Yonezawa, Yaita (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 409 days.

(21) Appl. No.: 12/278,491

(22) PCT Filed: Aug. 10, 2006

(86) PCT No.: PCT/JP2006/315822
§ 371 (c)(1),
(2), (4) Date: Aug. 6, 2008

(87) PCT Pub. No.: WO2007/091340
PCT Pub. Date: Aug. 16, 2007

(65) Prior Publication Data
US 2009/0027629 A1    Jan. 29, 2009

(30) Foreign Application Priority Data
Feb. 7, 2006 (JP) .................................. 2006-030301

(51) Int. Cl.
*G03B 21/14* (2006.01)
*H04N 3/223* (2006.01)

(52) U.S. Cl. ........................................ 353/69; 348/747

(58) Field of Classification Search ................ 353/69, 353/70; 348/746, 747
See application file for complete search history.

(56) References Cited

U.S. PATENT DOCUMENTS
7,018,050 B2 *   3/2006   Ulichney et al. ................ 353/69

FOREIGN PATENT DOCUMENTS
| JP | 2003-29714 A | 1/2003 |
| JP | 2004-363665 A | 12/2004 |
| JP | 2005-38388 A | 2/2005 |

* cited by examiner

*Primary Examiner* — Thanh X Luu
(74) *Attorney, Agent, or Firm* — Birch, Stewart, Kolasch & Birch, LLP

(57) ABSTRACT

An image projection method and a projector are provided to be able to change aspect ratio or resolution of a projection image, without setting of keystone correction again. The projector sets a displayable region with a shape according to an aspect ratio and a resolution of the projection image. The projector converts coordinates of the displayable region into coordinates in a screen coordinate system, and generates a rectangular area with a desired aspect ratio in a region corresponding to the displayable region in the screen coordinate system and a portion included in a projecting range. The projector converts the coordinates of a rectangular area into coordinates of a range corresponding to the rectangular area in the panel coordinate system, forms an image in a range corresponding to the rectangular area, and projects the projection image on the screen.

6 Claims, 11 Drawing Sheets

FIG. 3A
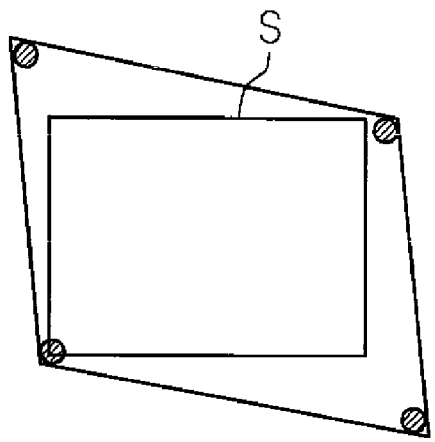
FIG. 3B
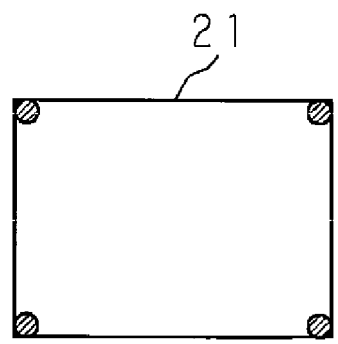
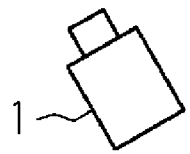
FIG. 3C
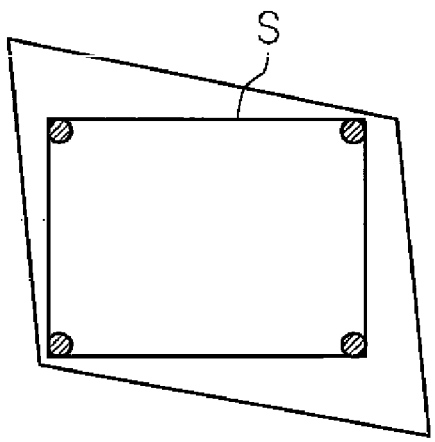
FIG. 3D
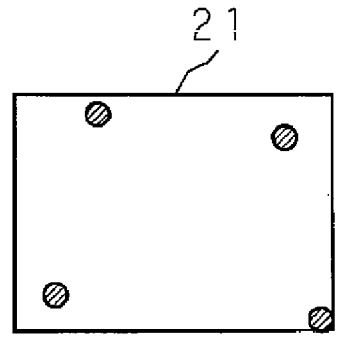
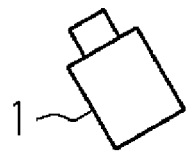

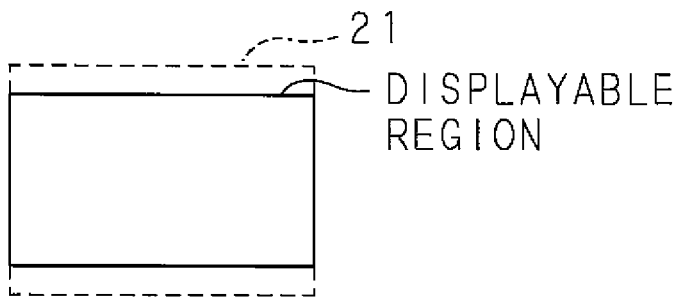
FIG. 7A PANEL COORDINATE SYSTEM
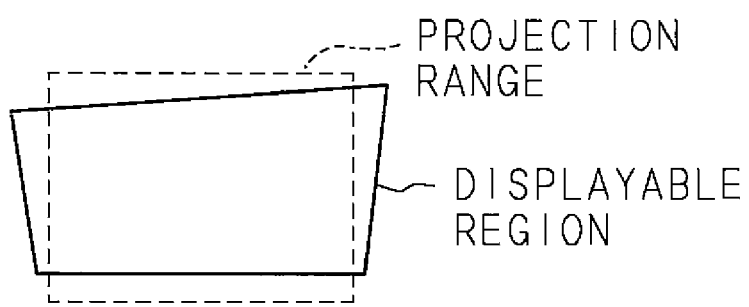
FIG. 7B SCREEN COORDINATE SYSTEM
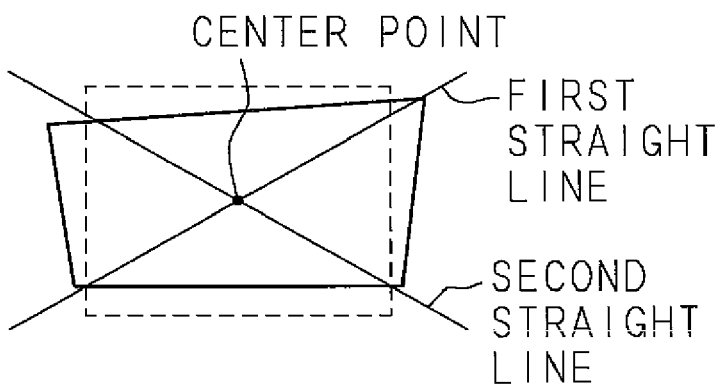
FIG. 7C SCREEN COORDINATE SYSTEM
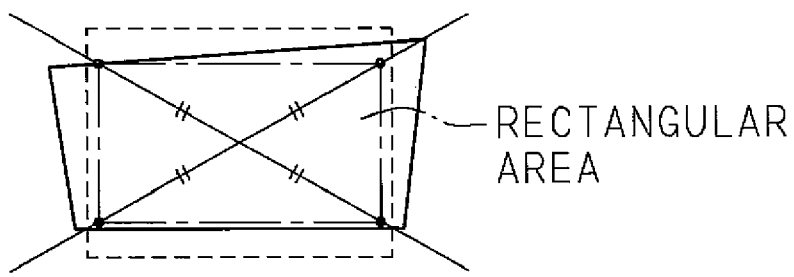
FIG. 7D SCREEN COORDINATE SYSTEM
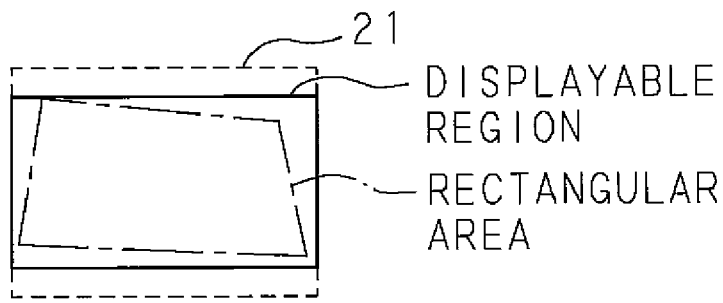
FIG. 7E PANEL COORDINATE SYSTEM

PRIOR ART  PRIOR ART

IMAGE REGION

IMAGE PROJECTION METHOD AND PROJECTOR

This application is the normal phase under phase 35 U.S.C. §371 of PCT International Application No. PCT/JP2006/315822 which has the international filing date of Aug. 10, 2006 and designated the United States of America.

BACKGROUND

1. Technical Field

This invention relates to a projector which projects a rectangular image to an external projection plane, such as a screen. More specifically, this invention relates to an image projection method for projecting the image, while correcting a shape of the image projected on the projection plane, and a projector which adopts the method.

2. Description of Related Art

In a field of presentation or video projection, a projector is used that accepts image data from outside and carries out extended image projection to a projection plane, such as an external screen or a wall, based on the accepted image data. Such a projector is provided with a planar image formation panel consisting of a liquid crystal panel or a DMD (Digital Micromirror Device), which forms an image. The projector carries out image projection by projecting to the external projection plane light reflected by the image formation panel, or light which penetrates the image formation panel. Thereby, the image is projected on the projection plane. Hereafter, the image projected on the projection plane is called a projection image, and the image formed by the image formation panel is called a panel image.

Generally, a shape of the projection image that the projector should project is a rectangle. When the projector is arranged so that the light can be perpendicularly projected to the projection plane, the projector can form the panel image to be rectangle shape and projects the light, so that the projector can project the rectangular projection image on the projection plane. However in many cases, the projector cannot be arranged to project light perpendicularly to the projection plane. In such a case, the projector may project light in an oblique direction to the projection plane, from the upper or lower side of the projection plane, or from the right or left side thereof. When the projector projects the light in the oblique direction to the projection plane after forming a rectangular panel image, a traveling distance of light to the projection place differs at both ends of the image, and a magnification of the image differs. Then, the shape of the projection image is distorted from the rectangle. The distortion of this projection image is called keystone distortion. For these reasons, a projector requires a function of the keystone correction which corrects the keystone distortion in order to form the projection image in a rectangle, by projecting light after changing beforehand the shape of a portion of a panel image corresponding to the projection image from the rectangle.

Conventionally, various methods have been proposed for performing the keystone correction with the projector. An exemplary method contains a step that detects the shape of the projection image or distance between the projector and the projection plane, and adjusts the shape of the panel image based on the detection result, thereby correcting the shape of the projection image automatically. An example of this art is described in Japanese Patent Application Laid-Open No. 2003-029714. In the case of using the art of automatic keystone correction case, although the projector needs a sensor to detect data required for the keystone correction, the keystone correction can be performed easily, without making the user to take time and effort. The exemplary method is also used which contains a step that the projector projects an outer frame or points at four corners which show the projection range on the projection plane, and specifies the position of the outer frame or the points of four corners by the user's operation in order to make the shape of the projection range be a rectangle with a predetermined aspect ratio, and by adjusting the shape of a position of the panel image corresponding to the projection range. Thus, the shape of the projection image is corrected. In a case of performing the keystone correction according to the user's operation, although the user needs to take time and effort for the operation, it is possible to use an area of the screen that is the projection plane to the limitation and to adjust the shape of the projection image to a certain extent freely.

By the way, it is known to use various values as the aspect ratio of an image. A horizontal to vertical ratio of 4:3 and 16:9 are used generally. Many conventional projectors comprise the image formation panel whose aspect ratio is set to be 4:3 or 16:9. In either case, the projector can project both of a projection image whose aspect ratio is 4:3 and a projection image whose aspect ratio is 16:9. FIG. 10A and FIG. 10B are schematic views showing how to project a projection image whose aspect ratio is 4:3 by a projector which has an image formation panel whose aspect ratio is 4:3. FIG. 10A shows an input image with an aspect ratio of 4:3 that is input to the projector to project the image whose aspect ratio is 4:3. The projector stores data of the input image, converts the data by keystone correction, deforms the input image, and forms a panel image containing the deformed input image with the image formation panel. FIG. 10B shows the panel image containing the deformed input image. An image region shown in FIG. 10B is a region of the input image deformed through keystone correction. The image region with an aspect ratio of 4:3 corresponds to the projection image projected on a projection plane. Portions of the panel image other than the imaging range are projected with black, for example.

FIG. 11A and FIG. 11B are schematic views showing how to project an image whose aspect ratio is 16:9 with a projector which has an image formation panel whose aspect ratio is 4:3. FIG. 11A shows an input image with an aspect ratio of 16:9 that is input to the projector to project the image.

FIG. 11B shows a panel image. Since the aspect ratio of the image formation panel is 4:3, the projector forms a panel image with the aspect ratio of 4:3, and the formed panel image includes the input image whose aspect ratio is 16:9. In this case, as shown in FIG. 11B, the projector sets offset regions that do not include the input image in the upper and lower portions of the panel image whose aspect ratio is 4:3. Then, the projector generates a displayable region whose aspect ratio is 16:9 in the panel image whose aspect ratio is 4:3, and keeps an input image deformed through keystone correction in the displayable region. An image region shown in FIG. 11B is a region of the input image deformed through the keystone correction. The image region with an aspect ratio of 16:9 corresponds to the projection image projected on a projection plane. For example, portions of the panel image other than the displayable region are projected in black, and the offset regions are not projected.

Thus, the projector with the image formation panel whose aspect ratio is 4:3 can project either a projection image whose aspect ratio is 4:3 or a projection image whose aspect ratio is 16:9 while performing the keystone correction. Similarly, a projector with an image formation panel whose aspect ratio is 16:9 can project a projection image whose aspect ratio is 4:3, by setting offset regions in the right and left portions of a panel image whose aspect ratio is 16:9. Furthermore, when a resolution of an image which should be projected is lower than a resolution of an image formation panel, a projector can project a desired projection image, by setting at the upper, lower, left and right portions of a panel image offset regions which correspond to the pixel that become unnecessary due to the reduction of the resolution.

SUMMARY

Problems to be Solved by the Invention

The projector can accept data of an input image from various devices, such as television tuner or personal computer (PC). Therefore, the aspect ratio or resolution of the image that should be projected may be changed. For example, in the case of projecting televised image, programs of movies may be broadcasted with an aspect ratio of 16:9, and the other programs may be broadcasted with an aspect ratio of 4:3. Furthermore, the aspect ratio or resolution of the projection image may be changed arbitrarily by preference of the user. However, when changing the aspect ratio or resolution of a projection image after setting the input image to be deformed by keystone correction, it causes deformation of the imaging range, in the panel image to be formed by the image formation panel, corresponding to the projection image whose aspect ratio or resolution is changed. Furthermore, it causes a change of the offset regions, and then the range of the displayable region is changed. As the results, there is a possibility that the imaging range becomes larger than the displayable region in the panel image and the projector cannot project the projection image. For this reason, it is necessary to repeat setting for keystone correction so that the imaging range corrected by keystone correction is included in the displayable region of the panel image. Therefore, every time the aspect ratio or resolution of the projection image is changed by the projector, it is necessary to repeat the setting for keystone correction. These situations cause the problem that quick alteration of the aspect ratio of the projection image or resolution cannot be performed. Especially, when setting for keystone correction according to the user's operation, there is a problem that the user's time and effort are increased.

The present invention is proposed in view of the above problems. One object of the present invention is to provide an image projection method for projecting a projection image whose aspect ratio or resolution can be changed without repetition of setting for keystone correction, by adjusting location and shape of the image which is an origin for the projection image and formed on the image formation panel; so that the image which is an origin for the projecting image is included in a range on the image formation panel corresponding to a projection range determined when setting for keystone correction and a displayable region. Another object of the present invention is providing a projector which can implement the method.

Another object of the present invention is to provide a projector which can project a projection image with easily viewable magnitude for the user by projecting the projection image whose aspect ratio or resolution is changed to be as large as possible.

Means for Solving the Problems

An image projection method according to the present invention is that an image projection method using a projector, which forms an image by a planar image formation panel and projects light from said planar image formation panel forming the image to an external projection plane, thereby projecting a projection image to said external projection plane, the method comprising: a step for setting a projection range where the projection image can be projected on said projection plane; a step for obtaining a method for mutual conversion between a panel coordinate system that defines a position on said image formation panel and a projection plane coordinate system that defines a position on said projection plane, based on coordinates of a range on said image formation panel corresponding to said projection range by projection and coordinates of said projection range in said projection plane coordinate system; a step for setting a displayable region where an original image for the projection image can be formed, on said image formation panel, according to an aspect ratio of the projection image to be projected; a step for calculating coordinates of said set up displayable region in said panel coordinate system; a step for converting said coordinates of said displayable region in said panel coordinate system to coordinates of a region corresponding to said displayable region in said projection plane coordinate system; a step for setting a rectangular area with a same aspect ratio as the projection image to be projected in a region corresponding to said displayable region and a portion included in said projection range in said projection plane coordinate system; a step for converting coordinates of said rectangular area in said projection plane coordinate system to coordinates of a range corresponding to said rectangular area in said panel coordinate system; a step for forming said original image for the projection image in a range corresponding to said rectangular area on said image formation panel represented by the converted coordinates; and a step for projecting light from said image formation panel forming said image to said projection plane.

An image projection method according to the present invention is an image projection method using a projector, which forms an image by a planar image formation panel and projects light from said image formation panel forming the image to an external projection plane, thereby projecting a projection image to said projection plane, the method comprising: a step for setting a projection range where the projection image can be projected on said projection plane; a step for obtaining a method for mutual conversion between a panel coordinate system that defines a position on said image formation panel and a projection plane coordinate system that defines a position on said projection plane, based on coordinates of a range on said image formation panel corresponding to said projection range by projection and coordinates of said projection range in said projection plane coordinate system; a step for setting a displayable region where an original image for the projection image can be formed on said image formation panel in a shape and size according to an aspect ratio and a resolution of the projection image to be projected; a step for calculating coordinates of said set displayable region in said panel coordinate system; a step for converting said coordinates of said displayable region in said panel coordinate system to coordinates of a region corresponding to said displayable region in said projection plane coordinate system; a step for setting a rectangular area with a same aspect ratio as an aspect ratio of the projection image to be projected, in a portion included said projection range and in a region corresponding to said displayable region in said projection plane coordinate system; a step for converting coordinates of said rectangular area in said projection plane coordinate system to coordinates of a range corresponding to said rectangular area in said panel coordinate system; a step for forming said original image for the projection image in a range corresponding to said rectangular area on said image formation panel represented by the converted coordinates; and a step for projecting light from said image formation panel forming said image to said projection plane.

A projector according to the present invention comprises a planar image formation panel and projection means for projecting a projection image to an external projection plane by projecting light from said image formation panel forming an image to said projection plane, the projector comprising: projection range setting means for setting a projection range where the projection image can be projected to said projection plane; means for calculating coordinates of a range, in a panel coordinate system which defines a position on said image formation panel, corresponding to said projection range on said projection plane by projection; means for setting coordinates of said projection range in a projection plane coordinate system that defines a position on said projection plane; means for calculating a conversion parameter that is required for a predetermined transformation formula to mutually convert a position in said panel coordinate system and a position in said projection plane coordinate system, based on coordinates corresponding to said projection range in said panel coordinate system and coordinates of said projection range in said projection plane coordinate system; means for setting a displayable region where an original image for the projection image can be formed, on said image formation panel, according to an aspect ratio of the projection image to be projected; means for calculating coordinates of said displayable region set by said means in said panel coordinate system; means for converting said coordinates of said displayable region in said panel coordinate system to coordinates of a region corresponding to said displayable region in said projection plane coordinate system, with the use of said conversion parameter; rectangular area setting means for setting a rectangular area with a same aspect ratio as the projection image to be projected, in a region corresponding to said displayable region and a portion included in said projection range in said projection plane coordinate system; means for converting coordinates of said rectangular area in said projection plane coordinate system to coordinates of a range corresponding to said rectangular area in said panel coordinate system, with the use of said conversion parameter; and image forming means for forming said original image for the projection image in a range corresponding to said rectangular area on said image formation panel represented by the coordinates converted by said means.

A projector according to the present invention is characterized in that said rectangular area setting means comprises: means for setting a central point of said projection range in said projection plane coordinate system; means for generating a first straight line passing said center point whose inclining angle is the same as an aspect ratio of said projection image and a second straight line passing said renter point whose inclining angle is a negative value of said aspect ratio of the projection image, in said projection plane coordinate system; means for obtaining an intersecting point that has a shortest distance from said central point of all intersecting points where said first straight line and said second straight line intersect with edges of a region corresponding to said displayable region or with edges of said projection range, in said projection plane coordinate system; and means for defining said rectangular area with four corners constituted of points on said first straight line or said second straight line whose distances from said center point are equal to a distance between said center point and said intersecting point, in said projection plane coordinate system.

A projector according to the present invention is characterized in that said projection range setting means is configured to set as said projection range a range occupied by a projection image on said projection plane, when said projection image with a specific aspect ratio is projected on said projection plane; the projector further comprising: means for deforming said original image for the projection image so that said original image falls within a range on the image forming panel corresponding to said projection range and keystone correction is performed, when a aspect ratio of the projection image to be projected is the same as said specific aspect ratio; and means for forming said original image deformed by said means in said range on said image forming panel.

A projector according to the present invention is characterized in that said image forming means comprises: means for obtaining a parameter required for a predetermined transformation formula that deforms said original image for the projection image so that said original image falls within a range on said image formation panel corresponding to said rectangular area and keystone correction is performed, based on the coordinates of a range corresponding to said rectangular area in said panel coordinate system; means for deforming said original image with the use of said parameter set by said means; and means for forming said image deformed by said means in a range corresponding to said rectangular area on said image formation panel.

In the present invention, a projector projects a projection image to an external projection plane, such as a screen, by setting up on an image formation panel a displayable region with a shape according to an aspect ratio of the projecting image to be projected, making said image formation panel form an image, and projecting light externally from said image formation panel forming said image. The projector sets a projection range on the projection plane, and then converts coordinates of the displayable region in a panel coordinate system according to an aspect ratio of the projection image to be projected, to coordinates in a projection plane coordinate system. The projector generates a rectangular area with a desired aspect ratio in a region corresponding to the displayable region in the panel coordinate system and a portion included in the projection range, and then converts coordinates of the rectangular area in the projection plane coordinate system to coordinates of a range corresponding to the rectangular area in the panel coordinate system. The projector makes the image formation panel form an image in a range corresponding to the rectangular area. By projecting the image formed in a range corresponding to the rectangular area on the image formation panel, the projector projects the projection image fit in a rectangular area contained in the projection range on the projection plane.

Furthermore, in the present invention, a projector projects a projection image to an external projection plane, by setting on an image formation panel a displayable region with a shape and a size according to an aspect ratio and a resolution of the projecting image to be projected, making said image formation panel form an image, and projecting light externally from said image formation panel forming said image. The projector sets a projection range on the projection plane, and then converts coordinates of the displayable region in a panel coordinate system according to an aspect ratio and a resolution of the projection image to be projected, to coordinates in a projection plane coordinate system. The projector generates a rectangular area with a desired aspect ratio in a region corresponding to the displayable region in the panel coordinate system and a portion included in the projection range, and then converts coordinates of the rectangular area in the projection plane coordinate system to coordinates of a range corresponding to the rectangular area in the panel coordinate system. The projector makes the image formation panel form an image in a range corresponding to the rectangular area. By projecting the image formed in a range corresponding to the rectangular area on the image formation panel, the projector projects the projection image in a rectangular area with a size according to a desired resolution.

Furthermore, in the present invention, when setting the rectangular area in the projection plane coordinate system, the projector sets a rectangular area with a desired aspect ratio, so that one of the points at four corners centering around the central point of the projection range contacts an edge of a region corresponding to the displayable region or an edge of the projection range. Thus, the projector can set the rectangular area with the desired aspect ratio, with the largest possible size, at the center of the projection range.

Furthermore, in the present invention, when setting a projection image on the projection plane, the projector sets the projection image with a specific aspect ratio. The projector makes the image formation panel to form a deformed image so that the deformed image falls within a range corresponding to the projection range, in the case that an aspect ratio of the projection image is not changed from the specific aspect ratio. The projection image after keystone correction is projected to the projection range on the projection plane, by projecting the formed image.

Moreover, in the present invention, the projector deforms an original image for projection so that the original image falls within a range corresponding to the rectangular the image formation panel makes the image formation panel form, a panel image including the deformed original image, and then projects the projection image. Therefore, the projector can project the projection image in the rectangular area with a desired aspect ratio on the projection plane.

Effects of the Invention

In the present invention, a rectangular area with a desired aspect ratio is set according to an aspect ratio of a projection image to be projected, so that the rectangular area is included in a projection range and in a region corresponding to a displayable region on the image formation panel, then a projector makes the image formation panel form an image and projects a projection image so that the projection range is located in the rectangular area. Therefore, even when the projector changes an aspect ratio of a projection image, the projector can change the aspect ratio of the projection image easily and then project the projection image without re-execution of setting for keystone correction.

Furthermore, in the present invention, a rectangular area is set with a desired aspect ratio and a resolution according to an aspect ratio and a resolution of a projection image to be projected, so that the rectangular area is included in a projection range and in a range corresponding to a displayable region on the image formation panel and then a projector forms an image with the image formation panel and projects a projection image so that the projection image is located in the rectangular area. Therefore, even when the projector changes an aspect ratio and a resolution of a projection image, the projector can change the aspect ratio and the resolution of the projection image easily and project the projection image without performing setting for keystone correction again. Especially, because there is no need for the user to take time and effort for operating the projector to perform setting of keystone correction even when the user changes the aspect ratio and the resolution of the projection image, a shape of the projection image is automatically changed even when an aspect ratio or a resolution of an image corresponding to a input image data are changed. Besides, the projector can change the aspect ratio or the resolution of the projection image easily, and thus provides improved usability.

Furthermore, in the present invention, because the projector can set the rectangular area with a desired aspect ratio, with a largest possible size, at the center of the projection range, the projector can avoid unnecessary reduction of the size of the projection image to be projected to the rectangular area, and thus the projector can project projection images with various aspect ratios, with an easy-to-see size.

Furthermore, in the present invention, the projector can project a projection image corrected by keystone correction to have a rectangular shape, on the entire projection range set to have a rectangular shape with a specific aspect ratio, without performing setting of a rectangular area in the case that an aspect ratio of the projection image is not changed from the specific aspect ratio.

Moreover, in the present invention, the projector deforms an original image for projection so that the original image falls within a range corresponding to the rectangular area on the image formation panel, forms a panel image including the deformed original image and projects the projection image which is formed by the image formation panel, a panel image including the deformed original image. Therefore, the projector can project the projection image in the rectangular area with a desired aspect ratio on the projection plane, and thus, the projector can project the projection image with a desired aspect ratio quickly. The present invention brings beneficial effects, such as described above.

BRIEF DESCRIPTION OF THE SEVERAL VIEWS OF THE DRAWINGS

FIG. 3A, FIG. 3B, FIG. 3C and FIG. 3D show exemplary schematic views illustrating correspondence between a projecting range on a screen and a pattern image formed by an image formation panel;

FIG. 7A, FIG. 7B, FIG. 7C, FIG. 7D and FIG. 7E show schematic views illustrating procedures to change the details of keystone correction in a panel coordinate system and in a screen coordinate system;

Figure 1:
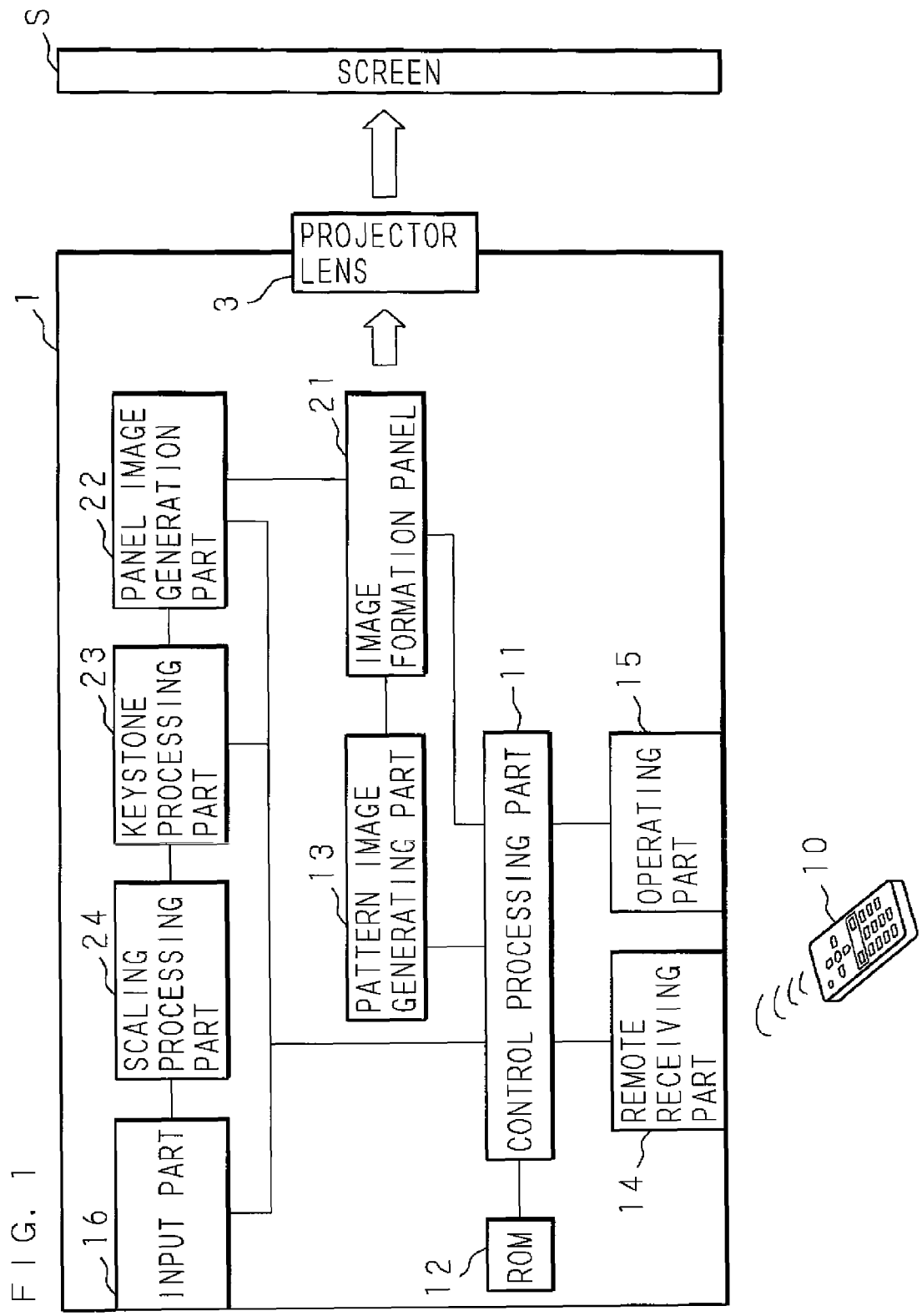
FIG. 1 is a block diagram illustrating functions in a projector of the present invention.

DESCRIPTION OF THE NUMERALS 1 projector
10 remote controller
11 control processing part
13 pattern image generating part
14 remote receiving part
15 operating part
16 input part
21 image formation panel
23 keystone processing part
S screen (projection plane)

DETAILED DESCRIPTION

Hereinafter, based on the drawings illustrating embodiments of the present invention, the present invention will be specifically described. FIG. 1 is a block diagram showing the functions inside a projector according to the present invention. The projector 1 comprises a control processing part 11 composed of a processor carrying out arithmetic and a RAM for storing information for the arithmetic. The control processing part 11 is connected to a ROM 12 storing control programs, and performs a process to control entire operation of the projector 1 according to the control programs stored in the ROM 12. The control processing part 11 is connected to a remote receiving part 14 which receives a signal sent by using, e.g. infra-red radiation or electric wave from a remote controller (remote) 10 operated by the user, and an operating part 15 which composed of various kinds of switches and accepts various kinds of instructions for processing through the user's operation. The remote receiving part 14 and the operating part 15 are configured to accept various kinds of instructions for processing and perform a processing according to the accepted instructions for processing.

Moreover, the projector 1 comprises a planar image formation panel 21 which is composed of a liquid crystal panel or a DMD, or the like. The image formation panel 21 has plural pixels constituted of liquid crystal, minute mirrors, etc, to form a panel image with a predetermined resolution defined by the number of pixels. The projector 1 projects light to the image formation panel 21, using a light source and an optical system which are not shown. Furthermore, the projector 1 comprises a projector lens 3 which projects to the outside the light projected to the image formation panel 21 and reflected by the image formation panel 21. The white arrow in FIG. 1 shows light. The light from the projector lens 3 is projected to an external screen (projection plane) S of the projector 1, and then a projection image is projected on a surface of the screen S. In addition, the projector 1 may be configured to project a projection image by projecting light passing through the image formation panel 21 that has formed a panel image.

The projector 1, furthermore, comprises an input part 16 to input image data from external devices, such as a television tuner or a PC. The input part 16 is connected to a scaling processing part 24 to scale an image created from input image data input to the input part 16, in accordance with the resolution of the image formation panel 21. The scaling processing part 24 is connected to a keystone processing part 23 to perform keystone correction for the image scaled by the scaling processing part 24. The keystone processing part 23 is connected to a panel image generation part 22 to generate a panel image including the image keystone-corrected by the keystone processing part 23. The panel image generation part 22 is connected to the image formation panel 21 to form the panel image generated by the panel image generation part 22.

The image formation panel 21 is, moreover, connected to a pattern image generation part 13 to generate a pattern image constituted of an outer frame or points at the four corners, which shows a range of the projection image. The projector 1 is configured to project an image showing a range of the projection image to the screen S, by making the image formation panel 21 to form the pattern image generated by the pattern image generation part 13. The input part 16 is connected to the control processing part 11, and information on the input image data is input into the control processing part 11. Moreover, the pattern image generation part 13, the keystone processing part 23, the panel image generation part 22, and the image formation panel 21 are connected to the control processing part 11, and their operations are controlled by the control processing part 11.

Next, description will be given to an image projection method according to the present invention, which is performed by the projector 1 comprising the configuration described above. The control processing part 11 sets an offset region and a displayable region in a range where the image formation panel 21 forms an image, according to an aspect ratio and resolution of a projection image to be projected based on the image data input to the input part 16. The offset region is a region where an original image for the projection image is not formed and the displayable region is a region where an original image for the projection image can be formed. The whole area of the image formation panel 21 is configured to be the displayable region, when the image formation panel 21 is configured to have an aspect ratio of 4:3, the aspect ratio of the projection image is 4:3, and the resolution of the projection image is higher than the resolution of the image formation panel 21. On the occasion when the projector 1 first projects the projection image, the image formation panel 21 forms a panel image that is the original image for projection displayed on the whole area of the displayable region. It is often the case that screen S is previously configured to have a predetermined aspect ratio, such as 4:3 or 16:9 and so on, in accordance with the aspect ratio of the projection image. When a projection image with the aspect ratio of 4:3 is projected to the screen S with the aspect ratio of 4:3, the projection image can be projected on the whole area of the screen S. However, the projection image projected by the projector 1 to the screen S is projected in a distorted shape from a rectangular shape, because the projector 1 is rarely put just in front of the screen S. Therefore, it is required, first of all, to correct the keystone distortion of the projection image by keystone correction.

Figure 2:
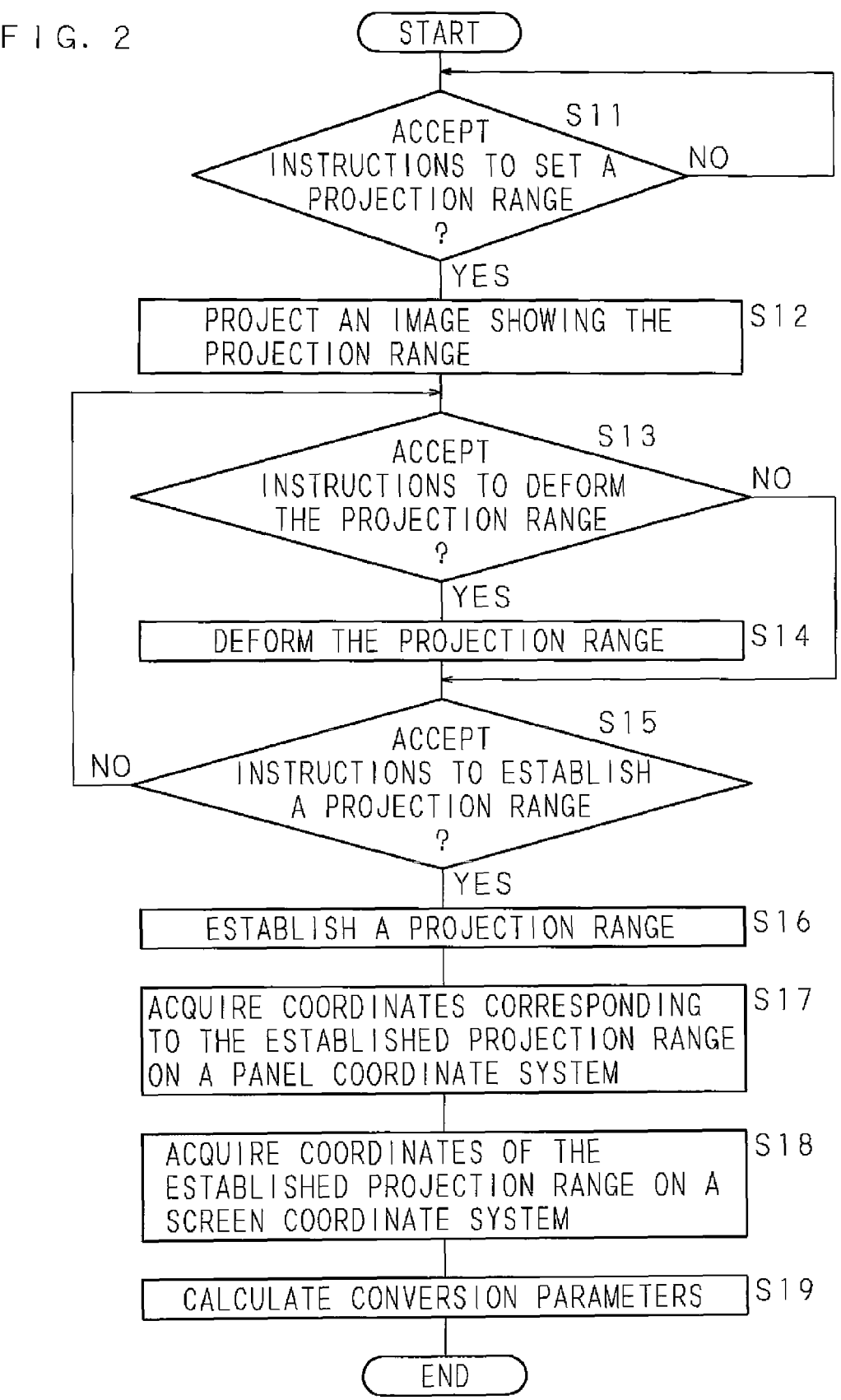
FIG. 2 is a flowchart illustrating procedures of keystone correction performed by a projector of the present invention.

FIG. 2 is a flowchart showing procedures for setting the keystone correction performed by the projector 1. The processing part 11 waits for acceptance of instructions to set a projection range, which shows a range where the projection image can be projected on the screen S (S11), as the instructions are given by a predetermined operation of the user to the operation part 15 or by a predetermined operation of users to the remote 10 to make the remote receiving part 14 receive a predetermined signal sent from the remote 10. When the control processing part 11 does not accept the instructions to set the projection range (S11: NO), the control processing part 11 keeps on waiting for acceptance of instructions. When the control processing part 11 accepts the instructions to set a projection range (S11: YES), the control processing part 11 makes the pattern image generation part 13 to generate a pattern image showing a range of the projection image with a specific aspect ratio, such as 4:3 and so on, and makes the image formation panel 21 to form the generated pattern image. The image showing a range of the projection image is projected to the screen S, by projecting light reflected by the image formation panel 21, from the projector lens 3 (S12). At that time, the projector 1 projects an image consisting of four luminescent spots corresponding to the four corners of the projection range, to the screen S. In addition, the projector may be configured to perform processing to project an image consisting of luminescent line corresponding to the outer frame of the projection range.

FIG. 3A, FIG. 3B, FIG. 3C and FIG. 3D are exemplary schematic views illustrating correspondence between a projecting range on the screen S and a pattern image formed by the image formation panel 21. FIG. 3A shows an image projected on the screen S, in the case that the pattern image is formed on the whole area of image formation panel 21. FIG. 3B shows the image formation panel 21 forming the pattern image on the whole area of the image formation panel 21. Filled circles in the figures show luminescent spots corresponding to the four corners of the projection range. As shown in FIG. 3A, generally, a range where the whole area of the image formation panel 21 is projected on the screen S, does not correspond to a range where an image can be projected on the screen S, and the shape of the range is distorted from a rectangular shape. When visually recognizing such an image as shown in FIG. 3A, the user inputs instructions to deform the projection range by displacing the respective luminescent spots corresponding to the four corners of the projection range, through operation of the operation part 15 or the remote 10.

After the step S12 is completed, the control processing part 11 waits for acceptance of instructions to deform the projection range (S13). When the control processing part 11 accepts the instructions to deform the projection range (S13: YES), the control processing part 11 displaces positions of the luminescent spots projected on the screen S, and thereby deforms the projection range, by displacing each position of the luminescent spot involved in the pattern image generated by the pattern image generation part 13 (S14). When the control processing part 11 does not accept instructions to deform the projection range at the step S13(S13: NO), or when the step S14 is completed, the control processing part 11 waits for acceptance of instructions to establish a projection range, to be given by the user through operation of the operation part 15 or the remote 10(S15). When the control processing part 11 does not accept instructions to establish the projection range (S15: NO), the control processing part 11 returns procedures to the step S13. When the control processing part 11 accepts instructions to establish the projection range (S15: YES), the control processing part 11 establishes a projection range corresponding to the pattern image generated by the pattern image generation part 13 (S16).

FIG. 3C shows a projection range established on the screen S. The user operates the projector 1 to make the projection range with rectangular shape, as shown in the figure, while visually recognizing the projected image. When the aspect ratio of the projection range is the same as the aspect ratio of the screen S, the whole area of the screen S can be utilized as the projection range, by displacing the luminescent spots corresponding to the four corners of the projection range at four corners of the screen S, as shown in the figure. FIG. 3D shows the image formation panel 21 forming a pattern image corresponding to the established projection image on the screen S. The luminescent spots on the image formation panel 21 corresponding to the four corners of the projection range moves, in accordance with the displacement of the luminescent spots corresponding to the four corners of the projection range on the screen S to form the projection range into a rectangular shape. The range framed by the four luminescent spots on the image formation panel 21 is a range corresponding to the projection range on the image formation panel 21, and an image formed in this range is projected to the projection range on the screen S.

The control processing part 11, then, acquires coordinates of a range corresponding to the established projection range, on a panel coordinate system that defines a position of a spot on the image formation panel 21 (S17). The control processing part 11 previously defines a panel coordinate system. For example, when the image formation panel 21 is configured with 1024×768 pixels, the control processing part 11 defines a coordinate of a pixel at upper left corner on the image formation panel 21 as (0, 0), and a coordinate of each pixel on the image formation panel 21 as (x, y) where x is $0 \leq x \leq 1024$ and y is $0 \leq y \leq 768$. The control processing part 11 acquires coordinates of a range corresponding to the established projection range, by acquiring coordinates of pixels at the positions of the luminescent spots on the image formation panel 21 corresponding to the four corners of the projection range, on the defined panel coordinate system.

The control processing part 11, then, acquires coordinates of the established projection range on a screen coordinate system (projection plane coordinate system) that defines a position of a spot on the screen S (S18). At this time, the control processing part 11 sets the values of an aspect ratio and a resolution of the projection range the same as the aspect ratio and the resolution of the displayable region of the image formation panel 21 at the time the projection range is set to define the screen coordinate system. For example, when the whole area of an image formation panel with 1024×768 pixels is the displayable region, the control processing part 11 defines the screen coordinate system to make the respective coordinates of the four corners of the projection range to be (0, 0), (0, 768), (1024, 0) and (1024, 768). In addition, any given coordinate system may be set as a screen coordinate system. The control processing part 11 can acquire the coordinates of the projection range on the screen coordinate system, by acquiring the coordinates of the four corners of the projection range as just described.

The control processing part 11 calculates conversion parameters for a predetermined conversion formula for mutually converting a position on the panel coordinate system and a position on the screen coordinate system by projecting a position on the image formation panel 21 to a surface on the screen S (S19). This conversion is a coordinate conversion based on projective transformation between the panel coordinate system and the screen coordinate system. Known formulas include a common conversion formula to convert coordinates from a panel coordinate system to a screen coordinate system and a common conversion formula to convert coordinates from a screen coordinate system to a panel coordinate system using the projective transformation. The control program stored by ROM 21 includes these conversion formulas. The control processing part 11 calculates conversion parameters for a the conversion formula, based on correspondence between coordinates on the panel coordinate system corresponding to the four corners of the projection range and coordinates on the screen coordinate system. The control processing part 11 stores the calculated conversion parameters and completes the process for the projection range setup.

Figure 4:
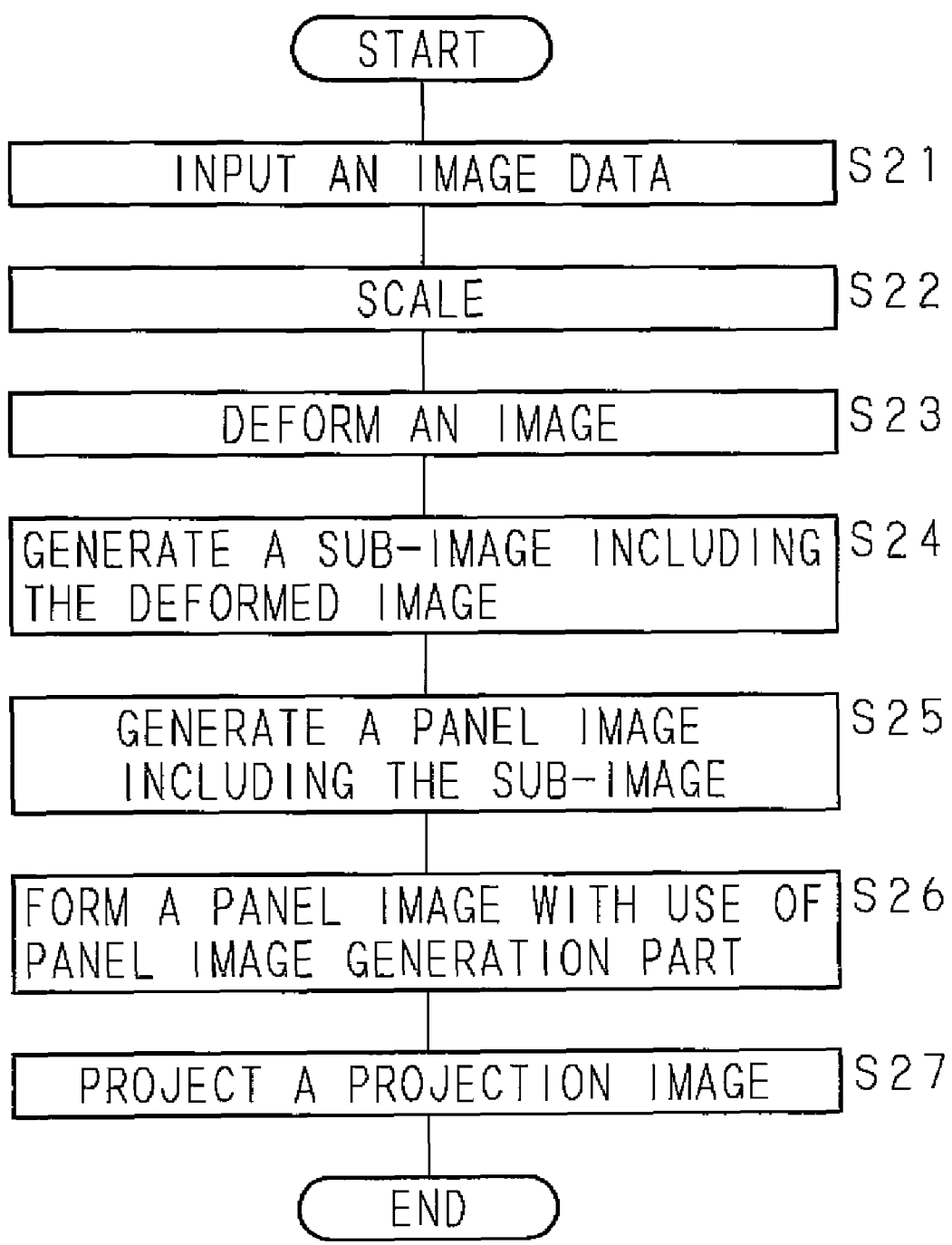
FIG. 4 is a flowchart illustrating procedures of image projection using keystone correction performed by a projector of the present invention.
Figure 10A:
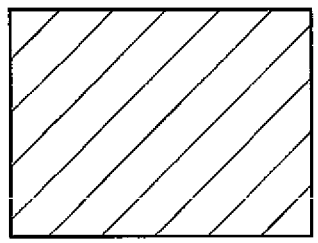
FIG. 10 shows schematic views illustrating a method for projecting a projection image with an aspect ratio of 4:3 by using a projector which has an image formation panel with an aspect ration of 4:3.
Figure 10B:
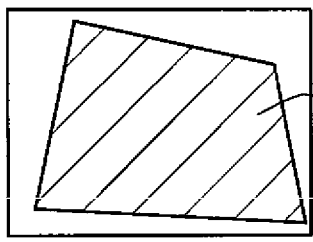
Figure 11A:
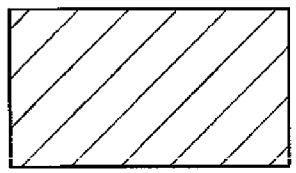
FIG. 11 shows schematic views illustrating a method for forming an image with an aspect ratio of 16:9 by using a projector which has an image formation panel with an aspect ration of 4:3.
Figure 11B:
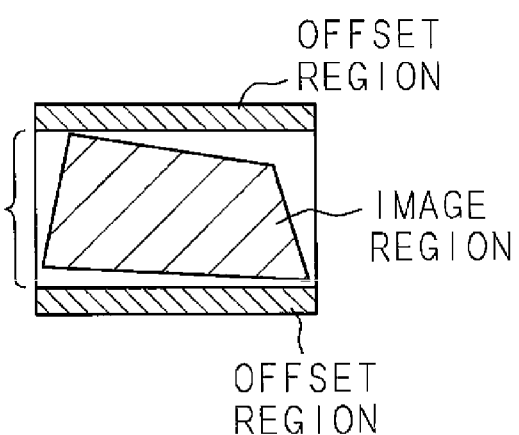

After the completion of the projection range setup, the projector 1 performs keystone correction for a projection image to project the projection image within the set up projection range, in the condition that the aspect ratio and the resolution of the projection image is not changed. FIG. 4 is the flowchart showing procedures of the process that the projector 1 performs keystone correction and projects an image. When image data is input from external to the input part 16 (S21), the scaling processing part 24 scales an image based on the input image data, according to the resolution of the image formation panel 21 (S22). For example, when an image with 1280×720 resolution is input, the scaling processing part 24 reduce the image to an image with 1024×768 resolution, corresponding to the image formation panel 21. The control processing part 11, then, makes the keystone processing part 23 deform the image scaled by the scaling processing part 24, to fall the image into a range on the image formation panel 21 corresponding to the projection range (S23). The keystone processing part 23, as shown in FIG. 10B, generates a sub-image including the deformed image (S24). The panel image generation part 22 generates a panel image including a portion corresponding to the offset region of the image formation panel 21 and a panel image including the sub-image generated by the keystone processing part 23 (S25). Since the image formation panel 21 does not have an offset region and the whole area of the image formation panel 21 is the displayable region in the case that the aspect ratio of the projection image is the same as the aspect ratio of the image formation panel 21, the panel image matches the sub-image. The control processing part 11 makes the image formation panel 21 form the panel image generated by the panel image generation part 22 (S26), projects the keystone-corrected projection image corrected for keystone correction to the screen S, by projecting from the projector lens 3 the light reflected by the image formation panel 21 which has formed the panel image (S27). Thus, the projector 1 completes the process, and repeats the process every time the image data is input into the input part 16.

Figure 5:
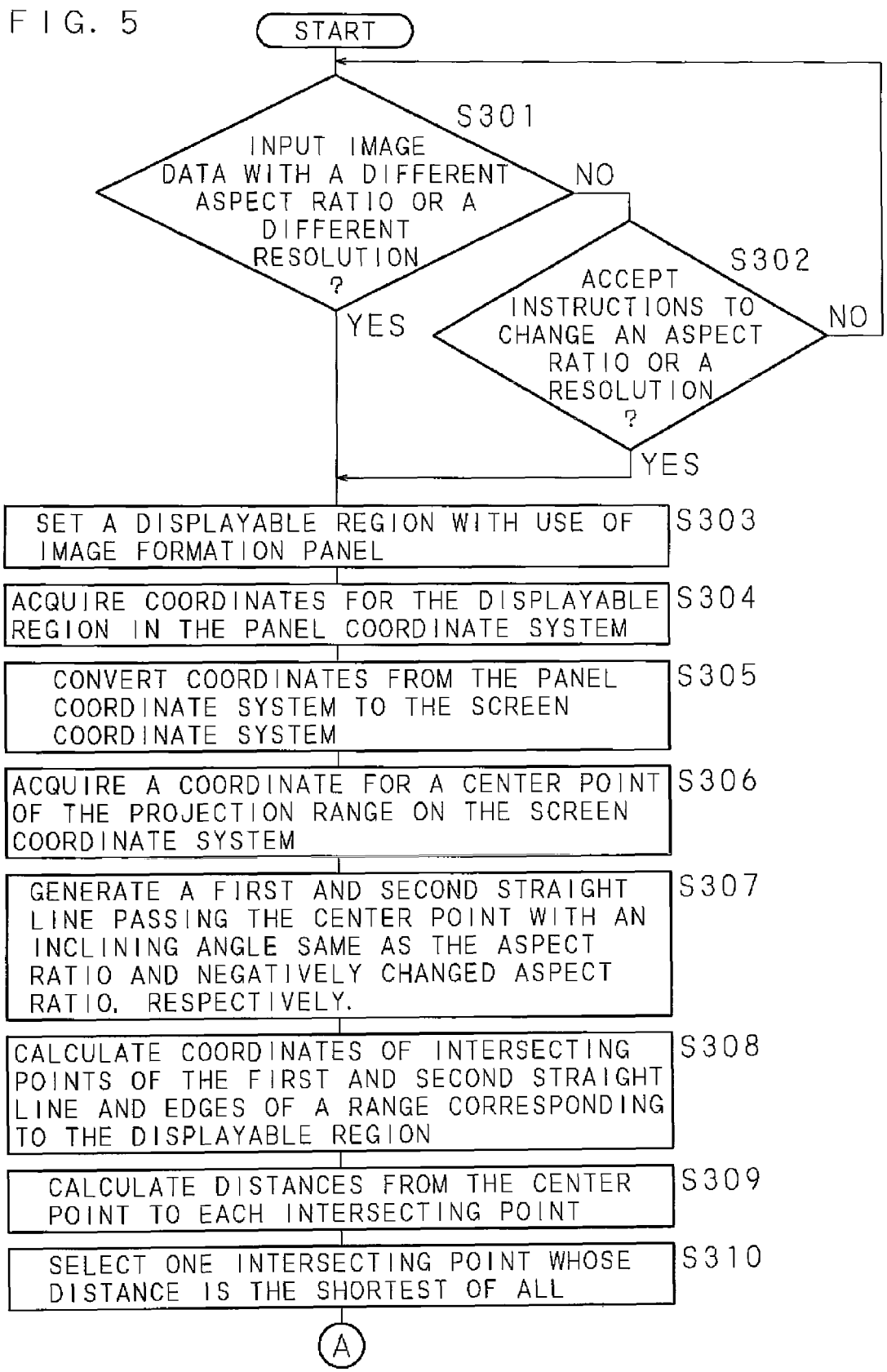
FIG. 5 is a flowchart illustrating procedures to change the details of keystone correction performed by a projector of the present invention.
Figure 6:
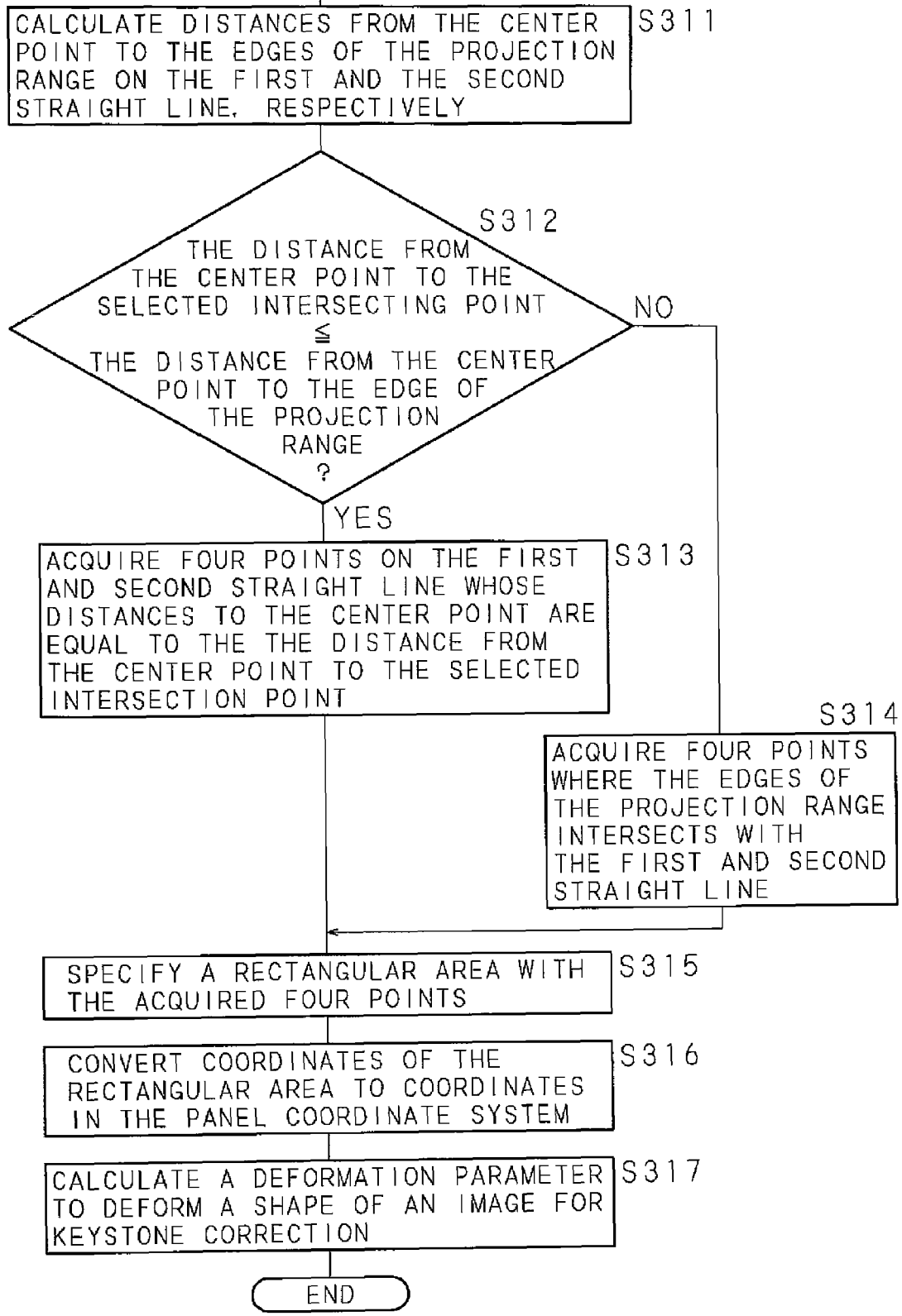
FIG. 6 is a flowchart illustrating procedures to change the details of keystone correction performed by a projector of the present invention.

The projector 1, according to the present invention) performs processing to project a projection image with changed details of keystone correction, when it is required to project the projection image with a different aspect ratio or a different resolution from the aspect ratio and the resolution of the set up projection range. This situation is applied to the case that the input image data represents an image with a different aspect ratio from the aspect ratio of the set up projection range, the case that the input image data represents an image with a lower resolution than the resolution of the set up projection range, or the case that the projector 1 accepts instructions from the user to change the aspect ratio or the resolution of the projection image. FIG. 5 and FIG. 6 are flowcharts showing procedures to change the details of the keystone correction performed by the projector 1.

The control processing part 11 waits for input of image data into the input part 16 to make the aspect ratio or the resolution of the projection image to be different from the set up projection range (S301). When there is no input of image data with a different aspect ratio or a different resolution (S301: NO), the control processing part 11 waits for acceptance of instructions to change the aspect ratio or the resolution of the projection image given by the predetermined operation of the user to the operation part 15 or the remote 10 (S302). When there is no acceptance of the instructions (S302: NO), the control processing part 11 returns the process to the step S301. When there is an input of image data with a different aspect ratio or a different resolution at the step S301 (S301: YES), or when there is acceptance of instructions to change the aspect ratio or the resolution of the projection image (S302: YES), the control processing part 11 makes the image formation panel 21 set an offset region and a displayable region, corresponding to the changed aspect ratio or resolution of the projection image (S303). The control processing part 11, then, acquires coordinates for the set displayable region in the panel coordinate system (S304).

FIG. 7A, FIG. 7B, FIG. 7C, FIG. 7D and FIG. 7E, are schematic views showing the processing to change the details of keystone correction in a panel coordinate system and a screen coordinate system. In the figures, an exemplar case is showed where the aspect ratio of a projection image is changed from 4:3 to 16:9. In FIG. 7(*a*), broken lines show a range of the image formation panel 21 on the panel coordinate system, and solid lines show a range of the displayable region. As the aspect ratio is changed from 4:3 to 16:9, the offset regions are set at upper and lower portions of the image formation panel 21. Then, it sets displayable region with the aspect ratio of 16:9, which is smaller than the whole area of the image formation panel 21. The control processing part 11 acquires coordinates of the displayable region by acquiring, for example, coordinates of the four corners of the displayable region. The displayable region set at this process corresponds to the shape of the image before keystone correction.

The control processing part 11, then, converts the coordinates of the displayable region in the panel coordinate system to the coordinates in the screen coordinate system, with the use of the conversion formula and the conversion parameter to convert coordinates from the panel coordinate system to the screen coordinate system (S305). In FIG. 7B, broken lines show a projection range in the screen coordinate system, and solid lines show a range corresponding to a displayable region. Because of the offset regions, a range corresponding to the displayable region is reduced in the up-and-down direction than the projection range. The control processing part 11, then, acquires a coordinate for a center point of the projection range on the screen coordinate system (S306). At this time, the control processing part 11 averages coordinates for the four corners of the projection range in the screen coordinate system, and then acquires the coordinate for the center point. The control processing part 11, then, generates a first straight line passing the center point with an inclining angle whose value is the same as the changed aspect ratio of the projection image, and a second straight line passing the center point with an inclining angle whose value is a negative number obtained by multiplying the changed aspect ratio of the projection image by −1(S307). In FIG. 7C, the first straight line and the second straight line are shown. When the changed aspect ratio of the projection image is 16:9, the inclining angle of the first straight line is 9/16 and the inclining angle of the second straight line is −9/16.

The control processing part 11, then, calculates coordinates of intersecting points where the first straight line and the second straight line intersect with edges of a range corresponding to the displayable region on the screen coordinate system (S308). The control processing part 11, then, calculates distances on the screen coordinate system from the center point to each intersecting point whose coordinates have been calculated (S309), and selects one intersecting point whose distance is the shortest of all the calculated distances (S310). The control processing part 11, then, calculates distances from the center point to the edges of the projection range on the first straight line and on the second straight line, in the screen coordinate system (S311), and judges whether the distance from the center point to the selected intersecting point is equal to or shorter than the distance from the center point to the edge of the projection range (S312). When the distance from the center point to the selected intersecting point is equal to or shorter than the distance from the center point to the edge of the projection range (S321: YES), the control processing part 11 acquires four points on the first straight line and on the second straight line whose distances to the center point are equal to the distance from the center point to the selected intersection point, on the screen coordinate system (S313). When the distance from the center point to the selected intersecting point is longer than the distance from the center point to the edge of the projection range (S321: NO), the control processing part 11 acquires four points, on the screen coordinate system, where the edges of the projection range intersect with the first straight line and on the second straight line (S314).

After the step S313 or the step S314 is completed, the control processing part 11 specifies a rectangular area with the acquired four points as four corners in the screen coordinate system (S315). In FIG. 7D, dashed lines show a range of the rectangular area. The aspect ratio of the rectangular area is equal to the changed aspect ratio of the projection image, because the rectangular area has four corners consisting of four points, whose distances from the center point are equal to each other, on the first straight line with the changed aspect ratio of the projection image as the inclining angle and on the second straight line with the negative value of the changed aspect ratio of the projection image as the inclining angle. Furthermore, the rectangular area falls in a range corresponding to the displayable region and the projection range, because the rectangular area includes at its four corners the points whose distances from the center point are the shortest of all the intersecting points where the first straight line and the second straight line intersect with the edges of a range corresponding to the displayable region or with the edges of the projection range. Therefore, it is possible to project the projection image with the changed aspect ratio, by projecting an image within the specified rectangular area on the screen S.

The control processing part 11, then, converts coordinates of the rectangular area on the screen coordinate system to coordinates on the panel coordinate system, with the use of the conversion formula and the conversion parameter for converting coordinates from the screen coordinate system to the panel coordinate system (S316). FIG. 7E shows ranges corresponding to the displayable region and the rectangular area, in the panel coordinate system. Dashed lines show a range corresponding to the rectangular area on the panel coordinate system. It is possible to form an original image for the projection image within this range, because the range corresponding to the rectangular area falls in the displayable region even on the panel coordinate system.

The control processing part 11, then, acquires a position of the range corresponding to the rectangular area within the displayable region after subtracting a portion corresponding to offset regions of the image formation panel 21 from coordinates in the panel coordinate system, and then calculates a deformation parameter required for a predetermined deformation formula that deforms a shape of an image corresponding to the whole displayable region to be a shape of the range corresponding to the rectangular area for keystone correction (S317). This deformation formula is similar to the conversion formula that converts a position on the screen coordinate system to a position on the panel coordinate system, but differs in a value of the parameter from the conversion formula. It is possible to deform an image so as to fit an original image for the projection image within the range corresponding to the rectangular area and to perform keystone correction, by converting points on an image before keystone correction to points within a region corresponding to the rectangular area, utilizing the deformation formula and the deformation parameter. The control processing part 11 stores the calculated deformation parameter, and completes the processing to change the details of keystone correction.

Figure 8A:
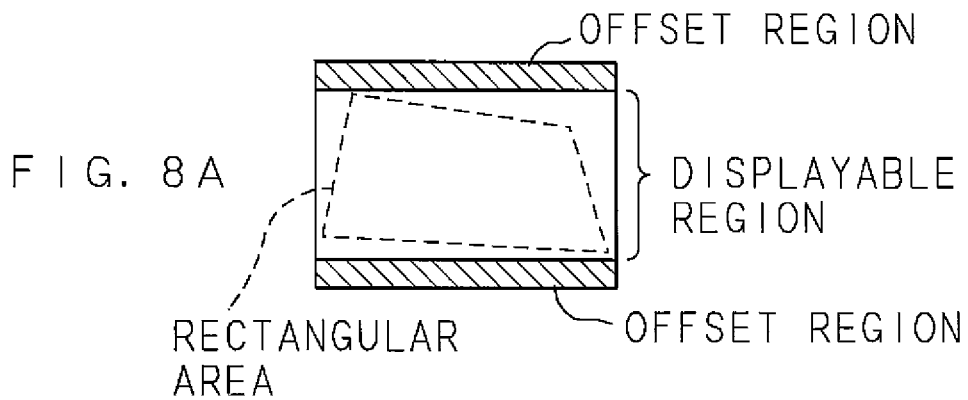
FIG. 8A, FIG. 8B, FIG. 8C, FIG. 8D, and FIG. 8E show schematic views illustrating procedures to project an image with an aspect ratio of 16:9 using an image formation panel whose aspect ratio is 4:3.
Figure 8B:
Figure 8C:
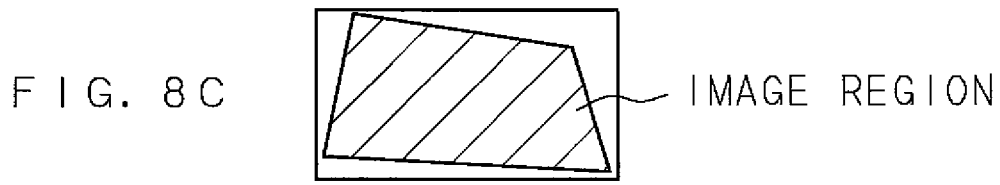
Figure 8D:
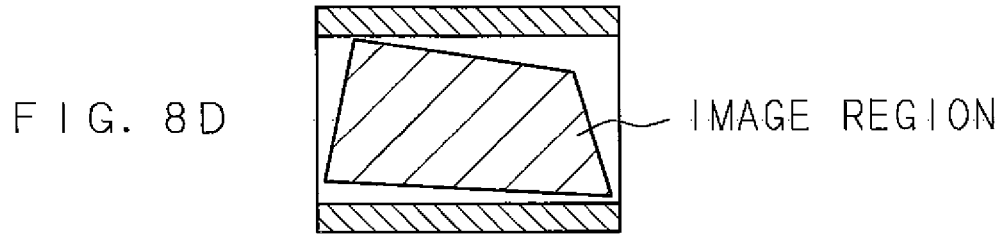
Figure 8E:
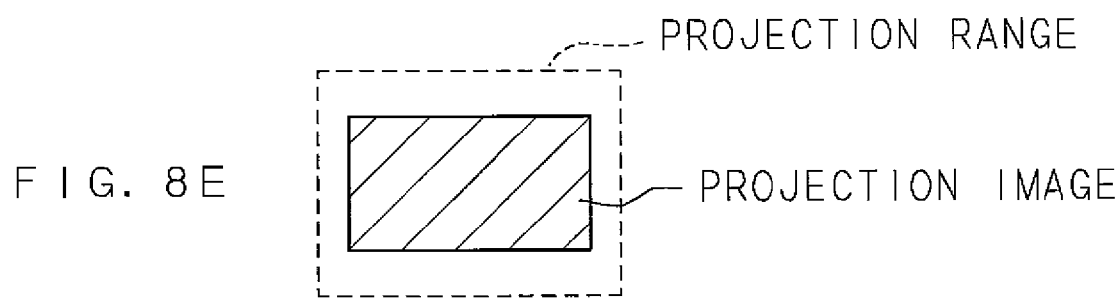
Figure 9A:
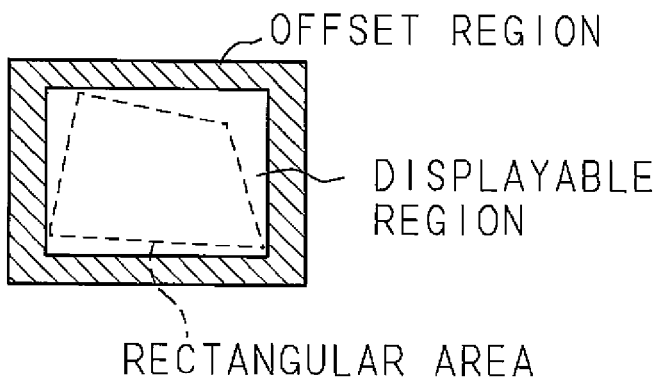
FIG. 9A, FIG. 9B, FIG. 9C, FIG. 9D, and FIG. 9E show schematic views illustrating procedures to project an image whose resolution is less than a projecting range.

After changing the details of keystone correction, the projector 1 projects an image according to the changed details of keystone correction, through the same process shown by the flowchart in FIG. 4. FIG. 8A, FIG. 8B, FIG. 8C, FIG. 8D, and FIG. 8E show schematic views illustrating procedures to project an image with an aspect ratio of 16:9 using an image formation panel 21 whose aspect ratio is 4:3. FIG. 9A, FIG. 9B, FIG. 9C, FIG. 9D, and FIG. 9E show schematic views illustrating procedures to project an image whose resolution is less than a projecting range. Hereinafter, the process is explained, with the use of FIG. 8A, FIG. 8B, FIG. 8C, FIG. 8D, FIG. 8E, FIG. 9A, FIG. 9B, FIG. 9C, FIG. 9D, FIG. 9E and FIG. 4, for the projector 1 to project an image after changing the details of keystone correction. FIG. 8A shows a condition of the image formation panel 21 when the aspect ratio of the projection image is 16:9. Offset regions are set at upper and lower portions of the image formation panel 21, and a displayable region is set with the aspect ratio of 16:9. For example, when the resolution of the image formation panel 21 is 1024×768, the resolution of the displayable region is 1024×576 by subtracting the offset regions from the image formation panel 21. FIG. 9A shows a condition of the image formation panel 21 when the resolution of the projection image is reduced. Offset regions are set at peripheral portions of the image formation panel 21, and the displayable region is set with the number of pixels corresponding to the reduced resolution. For example, when the resolution of the projection image is 768×576, the displayable region is set with 768×576 pixels. In FIG. 8A and FIG. 9A broken lines show a range corresponding to the rectangular area, which is acquired by the process shown by the flowchart in FIG. 5 and FIG. 6.

Figure 9B:
Figure 9C:
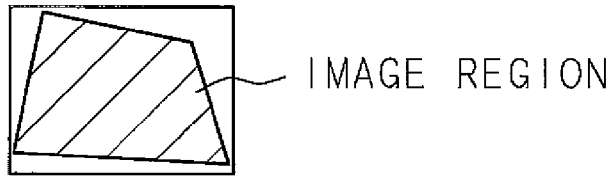
Figure 9D:
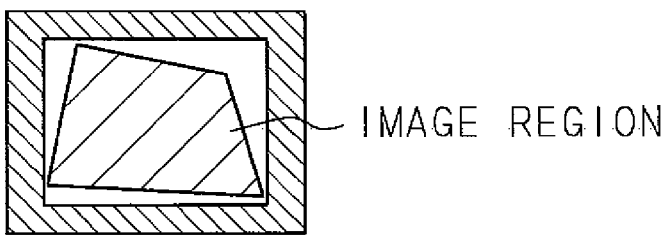
Figure 9E:
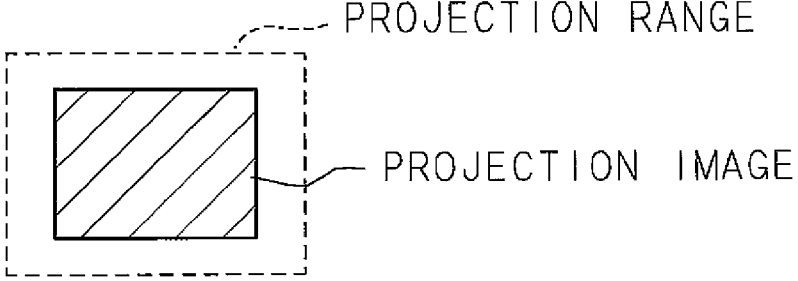

Image data is input from external to the input part 16 (S21). The scaling processing part 24 scales an image based on the input image data, according to the resolution of the displayable region of the image formation panel 21 (S22). FIG. 8B and FIG. 9B show the scaled image, according to the resolution of the displayable region. In FIG. 8B, the aspect ratio of the image is 16:9. In FIG. 9B, the aspect ratio of the image is 4:3 which is reduced in accordance with the lower resolution. The control processing part 11, then, makes the keystone processing part 23 deform the scaled image with the use of the deformation formula and the deformation parameter (S23). The keystone processing part 23 generates a sub-image including the deformed image (S24). FIG. 8C and FIG. 9C show exemplificative sub-images. Image regions, shown in the figures, correspond to the deformed image by keystone correction, and finally correspond to the projection region. The panel image generation part 22 generates a portion corresponding to the offset region and a panel image including the sub-image (S25). FIG. 8D and FIG. 9D show exemplificative panel images. The panel images include portions corresponding to the offset regions and the sub-image, and locate the image region at a range corresponding to the rectangular area. The control processing part 11, then, makes the image formation panel 21 form the panel image generated by the panel image generation part 22 (S26), and projects the projection image which is keystone-corrected in accordance with the changed details to the screen S, by projecting from the projector lens 3 the light reflected by the image formation panel 21 (S27). FIG. 8E and FIG. 9E show exemplificative projection images. In the figures, broken lines show projection ranges. In FIG. 8E, a projection image is projected with the aspect ratio of 16:9, within the projection range. In FIG. 9E, a scaled projection image is projected with reduced resolution, within the projection range.

As described above, in this invention, the projector 1 sets the projection range with a given aspect ratio on the screen S and acquires a range corresponding to the projection range on the image formation panel 21, when the projector 1 projects the projection image to the screen S. Furthermore, the projector 1 performs keystone correction by forming an original image for projection within a range acquired on the image formation panel 21 and projects the rectangular projection image to the screen S. When the aspect ratio and the resolution of the projection image are not changed, the projector 1 deforms the image to fall within a range corresponding to the projection range on the image formation panel 21, makes the image formation panel 21 form the panel image including the deformed image, and projects the projection image. By projecting the deformed image in this way, it is possible to project the projection image adjusted to be rectangular shape by keystone correction, in the whole area of the projection range with the given aspect ratio.

Moreover, in the present invention, the projector 1 obtains the conversion parameters required for the conversion formulas for mutual conversion between the panel coordinate system and the screen coordinate system based on the relationship between the coordinates of the projection range in the screen coordinate system and the coordinates of the range corresponding to the projection range in the panel coordinate system. When the aspect ratio and the resolution of the projection image are changed, the projector 1 converts the coordinates of the displayable region in the panel coordinate system according to the aspect ratio and the resolution to the coordinates in the screen coordinate system, and generates the rectangular area with a desired aspect ratio within a range corresponding to the displayable region in the screen coordinate system and the portions included in the projection range. Furthermore, the projector 1 converts the coordinates of the rectangular area in the screen coordinate system to the coordinates of a range corresponding to the rectangular area in the panel coordinate system, and makes the image formation panel 21 to form the image within a range corresponding to the rectangular area. By projecting the image formed within a range corresponding to the rectangular area on the image formation panel 21, it is possible to project the projection image within the rectangular area on the screen S. The projector 1 deforms the image so that the original image for projection falls within a range corresponding to the rectangular area on the image formation panel 21, makes the image formation panel 21 form the panel image including the deformed image, and projects the projection image. Thus, it is possible to project the projection image within the rectangular area on the screen S. Therefore, it is possible to project the projection image with the changed aspect ratio and with a size corresponding to the changed resolution. Thus, even when an aspect ratio or a resolution of the projection image is changed after setting keystone correction, the projector 1 can promptly project the projection image with a desired aspect ratio and size according to a desired resolution, without performing setting for keystone correction again Especially, because there is no need for the user to take time and effort for operating the projector to perform setting of keystone correction, a shape of the projection image is automatically changed even when an aspect ratio and a resolution of an image corresponding to a input image data are changed. Besides, the aspect ratio and the resolution of the projection image can be changed easily, and thus, improved usability of the projector can be provided.

Moreover, in the present invention, when setting the rectangular area within a region corresponding to the displayable region and a portion included in the projection range in the screen coordinate system, the projector 1 sets the rectangular area with a desired aspect ratio, so that one of the points at four corners centering around the central point of the projection range contacts an edge of a region corresponding to the displayable region or an edge of the projection range. Therefore, the rectangular area with the desired aspect ratio can be set, with the largest possible size, at the center of the projection range. Thus, the projector 1 can project projection images with several aspect ratio, with a high visibility size for the user without reducing the size of the projection image to become unduly smaller than required.

In addition, in the embodiments, while the projector according to the present invention is configured to set the projection range on the screen S, in response to the user's operation for setting keystone correction, the present invention should not be limited thereto, but the projector may be configured to pick up a pattern image projected on the screen S, and to set the projection range automatically so that the picked up pattern image becomes rectangular shape. Even in this case, the projector according to the present invention can project the projection image with a desired aspect ratio and a desired resolution within the set projection range, without performing the setting for keystone correction again, every time the aspect ratio or the resolution of the projection image is changed.

Moreover, in the embodiments, it is illustrated that the projector 1 projects the projection image to the screen S, but, even if the projection plane according to the present invention is configured to be different configuration, such as a house wall, the projector 1 according to the present invention is configured to be able to project the keystone-corrected projection image by performing with the same processing as described above. Moreover, in the embodiments, illustration is given only about the case that the displayable region on the image formation panel 21 is reduced in response to the change of the aspect ratio or the resolution of the projection image, but even if the displayable region on the image formation panel 21 is enlarged in response to the change of the aspect ratio or the resolution of the projection image, the projector 1 according to the present invention is able to perform similar processing as described above. Even in this case, the projector according to the present invention can project a projection image with a desired aspect ratio and a desired resolution within the set projection range.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image projection method using a projector, which forms an image by a planar image formation panel and projects light from said planar image formation panel forming the image to an external projection plane, thereby projecting a projection image to said external projection plane, the method comprising:
   a step for setting a projection range where the projection image can be projected on said projection plane;
   a step for obtaining a method for mutual conversion between a panel coordinate system that defines a position on said image formation panel and a projection plane coordinate system that defines a position on said projection plane, based on coordinates of a range on said image formation panel corresponding to said projection range by projection and coordinates of said projection range in said projection plane coordinate system;

a step for setting a displayable region where an original image for the projection image can be formed, on said image formation panel, according to an aspect ratio of the projection image to be projected;

a step for calculating coordinates of said set up displayable region in said panel coordinate system;

a step for converting said coordinates of said displayable region in said panel coordinate system to coordinates of a region corresponding to said displayable region in said projection plane coordinate system;

a step for setting a rectangular area with a same aspect ratio as the projection image to be projected in a region corresponding to said displayable region and a portion included in said projection range in said projection plane coordinate system;

a step for converting coordinates of said rectangular area in said projection plane coordinate system to coordinates of a range corresponding to said rectangular area in said panel coordinate system;

a step for forming said original image for the projection image in a range corresponding to said rectangular area on said image formation panel represented by the converted coordinates; and a step for projecting light from said image formation panel forming said image to said projection plane.

2. An image projection method using a projector, which forms an image by a planar image formation panel and projects light from said image formation panel forming the image to an external projection plane, thereby projecting a projection image to said projection plane, the method comprising:

a step for setting a projection range where the projection image can be projected on said projection plane;

a step for obtaining a method for mutual conversion between a panel coordinate system that defines a position on said image formation panel and a projection plane coordinate system that defines a position on said projection plane, based on coordinates of a range on said image formation panel corresponding to said projection range by projection and coordinates of said projection range in said projection plane coordinate system;

a step for setting a displayable region where an original image for the projection image can be formed on said image formation panel in a shape and size according to an aspect ratio and a resolution of the projection image to be projected;

a step for calculating coordinates of said set displayable region in said panel coordinate system;

a step for converting said coordinates of said displayable region in said panel coordinate system to coordinates of a region corresponding to said displayable region in said projection plane coordinate system;

a step for setting a rectangular area with a same aspect ratio as an aspect ratio of the projection image to be projected, in a portion included said projection range and in a region corresponding to said displayable region in said projection plane coordinate system;

a step for converting coordinates of said rectangular area in said projection plane coordinate system to coordinates of a range corresponding to said rectangular area in said panel coordinate system;

a step for forming said original image for the projection image in a range corresponding to said rectangular area on said image formation panel represented by the converted coordinates; and a step for projecting light from said image formation panel forming said image to said projection plane.

3. A projector, which comprises a planar image formation panel and projection means for projecting a projection image to an external projection plane by projecting light from said image formation panel forming an image to said projection plane, the projector comprising:

projection range setting means for setting a projection range where the projection image can be projected to said projection plane;

means for calculating coordinates of a range, in a panel coordinate system which defines a position on said image formation panel, corresponding to said projection range on said projection plane by projection;

means for setting coordinates of said projection range in a projection plane coordinate system that defines a position on said projection plane;

means for calculating a conversion parameter that is required for a predetermined transformation formula to mutually convert a position in said panel coordinate system and a position in said projection plane coordinate system, based on coordinates corresponding to said projection range in said panel coordinate system and coordinates of said projection range in said projection plane coordinate system;

means for setting a displayable region where an original image for the projection image can be formed, on said image formation panel, according to an aspect ratio of the projection image to be projected;

means for calculating coordinates of said displayable region set by said means in said panel coordinate system;

means for converting said coordinates of said displayable region in said panel coordinate system to coordinates of a region corresponding to said displayable region in said projection plane coordinate system, with the use of said conversion parameter;

rectangular area setting means for setting a rectangular area with a same aspect ratio as the projection image to be projected, in a region corresponding to said displayable region and a portion included in said projection range in said projection plane coordinate system;

means for converting coordinates of said rectangular area in said projection plane coordinate system to coordinates of a range corresponding to said rectangular area in said panel coordinate system, with the use of said conversion parameter; and image forming means for forming said original image for the projection image in a range corresponding to said rectangular area on said image formation panel represented by the coordinates converted by said means.

4. The projector according to claim 3, wherein said rectangular area setting means comprises:

means for setting a central point of said projection range in said projection plane coordinate system;

means for generating a first straight line passing said center point whose inclining angle is the same as an aspect ratio of said projection image and a second straight line passing said center point whose inclining angle is a negative value of said aspect ratio of the projection image, in said projection plane coordinate system;

means for obtaining an intersecting point that has a shortest distance from said central point of all intersecting points where said first straight line and said second straight line intersect with edges of a region corresponding to said displayable region or with edges of said projection range, in said projection plane coordinate system; and means for defining said rectangular area with four corners constituted of points on said first straight line or said second straight line whose distances from said center point are equal to a distance between said center point and said intersecting point, in said projection plane coordinate system.

5. The projector according to claim 3, wherein said projection range setting means is configured to set as said projection range a range occupied by a projection image on said projection plane, when said projection image with a specific aspect ratio is projected on said projection plane; the projector further comprising:

means for deforming said original image for the projection image so that said original image falls within a range on the image forming panel corresponding to said projection range and keystone correction is performed, when a aspect ratio of the projection image to be projected is the same as said specific aspect ratio; and means for forming said original image deformed by said means in said range on said image forming panel.

6. The projector according to claim 3, wherein said image forming means comprises:

means for obtaining a parameter required for a predetermined transformation formula that deforms said original image for the projection image so that said original image falls within a range on said image formation panel corresponding to said rectangular area and keystone correction is performed, based on the coordinates of a range corresponding to said rectangular area in said panel coordinate system;

means for deforming said original image with the use of said parameter set by said means; and means for forming said image deformed by said means in a range corresponding to said rectangular area on said image formation panel.

* * * * *